United States Patent
Livis et al.

(10) Patent No.: US 9,854,461 B2
(45) Date of Patent: Dec. 26, 2017

(54) METHODS FOR DETECTING AND CLASSIFYING SIGNALS TRANSMITTED OVER A RADIO FREQUENCY SPECTRUM

(71) Applicant: Shared Spectrum Company, Vienna, VA (US)

(72) Inventors: Eugene Livis, Vienna, VA (US); Mark Allen McHenry, McLean, VA (US); Dmitry Dain, Herndon, VA (US); Karl Steadman, Arlington, VA (US); Olga Ritterbush, Arlington, VA (US)

(73) Assignee: Shared Spectrum Company, Vienna, VA (US)

( * ) Notice: Subject to any disclaimer, the term of this patent is extended or adjusted under 35 U.S.C. 154(b) by 158 days.

(21) Appl. No.: 14/326,486

(22) Filed: Jul. 9, 2014

(65) Prior Publication Data
US 2015/0133058 A1   May 14, 2015

Related U.S. Application Data

(60) Continuation of application No. 13/286,745, filed on Nov. 1, 2011, now Pat. No. 8,793,791, which is a
(Continued)

(51) Int. Cl.
*H04W 24/04*    (2009.01)
*H04B 1/719*    (2011.01)
(Continued)

(52) U.S. Cl.
CPC ............ *H04W 24/04* (2013.01); *H04B 1/719* (2013.01); *H04B 17/345* (2015.01); *H04B 17/391* (2015.01)

(58) Field of Classification Search
CPC ...... H04W 24/04; H04W 16/14; H04B 1/719; H04B 17/009; H04B 1/71635;
(Continued)

(56) References Cited

U.S. PATENT DOCUMENTS

| 3,893,064 A | 7/1975 | Nishihara et al. |
| 3,935,572 A | 1/1976 | Broniwitz et al. |

(Continued)

FOREIGN PATENT DOCUMENTS

| EP | 1220499 A2 | 7/2002 |
| GB | 2260879 A  | 4/1993 |

(Continued)

OTHER PUBLICATIONS

Cabric D et al: "Implementation issues in spectrum sensing for cognitive radios", Conference Record of the Thirty-Eighth Asilomar Conference on Signals, Systems and Computers, IEEE, vol. 1, pp. 772-776 (Nov. 7-10, 2004).

(Continued)

*Primary Examiner* — Ping Hsieh
*Assistant Examiner* — James Yang
(74) *Attorney, Agent, or Firm* — Morris & Kamlay LLP

(57) ABSTRACT

A method for classifying a signal can be used by a station or stations within a network to classify the signal as non-cooperative (NC) or a target signal. The method performs classification over channels within a frequency spectrum. The percentage of power above a first threshold is computed for a channel. Based on the percentage, a signal is classified as a narrowband signal. If the percentage indicates the absence of a narrowband signal, then a lower second threshold is applied to confirm the absence according to the percentage of power above the second threshold. The signal is classified as a narrowband signal or pre-classified as a wideband signal based on the percentage. Pre-classified wideband signals are classified as a wideband NC signal or target signal using spectrum masks.

20 Claims, 7 Drawing Sheets

Related U.S. Application Data division of application No. 11/839,503, filed on Aug. 15, 2007, now Pat. No. 8,055,204.

(51) Int. Cl.
  *H04B 17/345* (2015.01)
  *H04B 17/391* (2015.01)

(58) Field of Classification Search
  CPC ...... H04B 17/309; H04J 13/0022; H04L 1/20; H04N 7/102; H04N 7/17309
  See application file for complete search history.

(56) References Cited

U.S. PATENT DOCUMENTS

| | | |
|---|---|---|
| 4,107,613 A | 8/1978 | Queen et al. |
| 4,119,964 A | 10/1978 | Fletcher et al. |
| 4,227,255 A | 10/1980 | Carrick et al. |
| 4,305,150 A | 12/1981 | Richmond et al. |
| 4,398,220 A | 8/1983 | Satoh |
| 4,501,020 A | 2/1985 | Wakeman |
| 4,672,657 A | 6/1987 | Dershowitz |
| 4,736,453 A | 4/1988 | Schloemer |
| 4,783,780 A | 11/1988 | Alexis |
| 4,803,703 A | 2/1989 | DeLuca et al. |
| 4,878,238 A | 10/1989 | Rash et al. |
| 4,881,271 A | 11/1989 | Yamauchi et al. |
| 4,918,730 A | 4/1990 | Schulze |
| 4,977,612 A | 12/1990 | Wilson |
| 5,040,238 A | 8/1991 | Comroe et al. |
| 5,065,334 A | 11/1991 | Taylor et al. |
| 5,093,924 A | 3/1992 | Toshiyuki et al. |
| 5,093,927 A | 3/1992 | Shanley |
| 5,142,690 A | 8/1992 | McMullan, Jr. et al. |
| 5,142,691 A | 8/1992 | Freeburg et al. |
| 5,151,747 A | 9/1992 | Nourrcier |
| 5,155,590 A | 10/1992 | Beyers, II et al. |
| 5,162,937 A | 11/1992 | Heidemann et al. |
| 5,177,604 A | 1/1993 | Martinez |
| 5,177,767 A | 1/1993 | Kato |
| 5,179,722 A | 1/1993 | Gunmar et al. |
| 5,203,012 A | 4/1993 | Patsiokas et al. |
| 5,225,902 A | 7/1993 | McMullan, Jr. |
| 5,239,676 A | 8/1993 | Strawczynski et al. |
| 5,247,701 A | 9/1993 | Comroe et al. |
| 5,260,974 A | 11/1993 | Johnson et al. |
| 5,271,036 A | 12/1993 | Lobert et al. |
| 5,276,908 A | 1/1994 | Koohgoli et al. |
| 5,325,088 A | 6/1994 | Willard et al. |
| 5,375,123 A | 12/1994 | Andersson et al. |
| 5,402,523 A | 3/1995 | Berg |
| 5,410,737 A | 4/1995 | Jones |
| 5,412,658 A | 5/1995 | Arnold et al. |
| 5,422,912 A | 6/1995 | Asser et al. |
| 5,422,930 A | 6/1995 | McDonald et al. |
| 5,428,819 A | 6/1995 | Wang et al. |
| 5,448,753 A | 9/1995 | Ahl et al. |
| 5,475,868 A | 12/1995 | Duque-Anton et al. |
| 5,497,505 A | 3/1996 | Koohgoli et al. |
| 5,502,688 A | 3/1996 | Recchione et al. |
| 5,511,233 A | 4/1996 | Otten |
| 5,548,809 A | 8/1996 | Lemson |
| 5,553,081 A | 9/1996 | Downey et al. |
| 5,585,850 A | 12/1996 | Schwaller |
| 5,608,727 A | 3/1997 | Perreault et al. |
| 5,655,217 A | 8/1997 | Lemson |
| 5,668,747 A | 9/1997 | Ohashi |
| 5,748,678 A | 5/1998 | Valentine et al. |
| 5,752,164 A | 5/1998 | Jones |
| 5,794,151 A | 8/1998 | McDonald et al. |
| 5,822,686 A | 10/1998 | Lundberg et al. |
| 5,828,948 A | 10/1998 | Almgren et al. |
| 5,850,605 A | 12/1998 | Souissi et al. |
| 5,862,487 A | 1/1999 | Fujii et al. |
| 5,884,181 A | 3/1999 | Arnold et al. |
| 5,889,821 A | 3/1999 | Arnstein et al. |
| 5,939,887 A | 8/1999 | Schmidt et al. |
| 5,943,622 A | 8/1999 | Yamashita |
| 5,960,351 A | 9/1999 | Przelomiec |
| 5,999,561 A | 12/1999 | Naden et al. |
| 6,011,970 A | 1/2000 | McCarthy |
| 6,044,090 A | 3/2000 | Grau et al. |
| 6,047,175 A | 4/2000 | Trompower |
| 6,049,707 A | 4/2000 | Buer et al. |
| 6,049,717 A | 4/2000 | Dufour et al. |
| 6,141,557 A | 10/2000 | Dipiazza |
| 6,147,553 A | 11/2000 | Kolanek |
| 6,154,501 A | 11/2000 | Friedman |
| 6,157,811 A | 12/2000 | Dent |
| 6,178,328 B1 | 1/2001 | Tang et al. |
| 6,188,873 B1 | 2/2001 | Wickman et al. |
| 6,208,858 B1 | 3/2001 | Antonio et al. |
| 6,240,274 B1 | 5/2001 | Izadpanah |
| 6,269,331 B1 | 7/2001 | Alanara et al. |
| 6,295,289 B1 | 9/2001 | Ionescu et al. |
| 6,304,140 B1 | 10/2001 | Thron et al. |
| 6,356,555 B1 | 3/2002 | Rakib et al. |
| 6,380,879 B2 | 4/2002 | Kober et al. |
| 6,522,885 B1 | 2/2003 | Tang et al. |
| 6,526,264 B2 | 2/2003 | Sugar et al. |
| 6,529,715 B1 | 3/2003 | Kitko et al. |
| 6,570,444 B2 | 5/2003 | Wright |
| 6,597,301 B2 | 7/2003 | Cerra |
| 6,606,593 B1 | 8/2003 | Jarvinen et al. |
| 6,615,040 B1 | 9/2003 | Benveniste |
| 6,625,111 B1 | 9/2003 | Sudo |
| 6,671,503 B1 | 12/2003 | Niwamoto |
| 6,675,012 B2 | 1/2004 | Gray |
| 6,687,492 B1 | 2/2004 | Sugar et al. |
| 6,690,746 B1 | 2/2004 | Sills et al. |
| 6,697,013 B2 | 2/2004 | McFarland et al. |
| 6,697,436 B1 | 2/2004 | Wright et al. |
| 6,700,450 B2 | 3/2004 | Rogers |
| 6,714,605 B2 | 3/2004 | Sugar et al. |
| 6,714,780 B1 | 3/2004 | Antonio et al. |
| 6,728,517 B2 | 4/2004 | Sugar et al. |
| 6,771,957 B2 | 8/2004 | Chitrapu |
| 6,785,520 B2 | 8/2004 | Sugar et al. |
| 6,792,268 B1 | 9/2004 | Benveniste et al. |
| 6,799,020 B1 | 9/2004 | Heidmann et al. |
| 6,816,832 B2 | 11/2004 | Alanara et al. |
| 6,847,678 B2 | 1/2005 | Berezdivin et al. |
| 6,850,735 B2 | 2/2005 | Sugar et al. |
| 6,850,764 B1 | 2/2005 | Patel |
| 6,862,456 B2 | 3/2005 | Sugar et al. |
| 6,891,496 B2 | 5/2005 | Husted et al. |
| 6,904,269 B1 | 6/2005 | Deshpande et al. |
| 6,915,530 B1 * | 7/2005 | Kauffman ............. H04N 7/102 348/E7.052 |
| 6,941,110 B2 | 9/2005 | Kloper et al. |
| 6,952,563 B2 | 10/2005 | Brown et al. |
| 6,959,178 B2 | 10/2005 | Macedo et al. |
| 6,965,762 B2 | 11/2005 | Sugar et al. |
| 6,990,087 B2 | 1/2006 | Rao et al. |
| 6,993,440 B2 | 1/2006 | Anderson et al. |
| 7,013,345 B1 | 3/2006 | Brown et al. |
| 7,020,451 B2 | 3/2006 | Sugar et al. |
| 7,035,593 B2 | 4/2006 | Miller et al. |
| 7,054,625 B2 | 5/2006 | Kawasaki et al. |
| 7,058,383 B2 | 6/2006 | Sugar et al. |
| 7,089,014 B2 | 8/2006 | Brown et al. |
| 7,116,943 B2 | 10/2006 | Sugar et al. |
| 7,224,752 B2 | 5/2007 | Sugar et al. |
| 7,227,974 B2 | 6/2007 | Kamijo et al. |
| 7,254,191 B2 | 8/2007 | Sugar et al. |
| 7,260,156 B2 | 8/2007 | Krupezevic et al. |
| 7,269,151 B2 | 9/2007 | Diener et al. |
| 7,292,656 B2 | 11/2007 | Kloper et al. |
| 7,313,393 B2 | 12/2007 | Chitrapu |
| 7,342,876 B2 | 3/2008 | Bellur et al. |
| 7,424,268 B2 | 9/2008 | Diener et al. |
| 7,428,270 B1 | 9/2008 | Dubuc et al. |
| 7,457,295 B2 | 11/2008 | Saunders et al. |
| 7,463,952 B2 | 12/2008 | Bidou et al. |

(56) References Cited

U.S. PATENT DOCUMENTS

| | | |
|---|---|---|
| 7,483,700 B2 | 1/2009 | Buchwald et al. |
| 7,532,857 B2 | 5/2009 | Simon |
| 7,564,816 B2 | 7/2009 | McHenry et al. |
| 7,610,036 B2 | 10/2009 | Teo et al. |
| 7,613,148 B2 | 11/2009 | Hong et al. |
| 7,742,764 B2 | 6/2010 | Gillig et al. |
| 7,826,839 B1 | 11/2010 | Nicholas |
| 2001/0013834 A1 | 8/2001 | Yamazaki |
| 2001/0046843 A1 | 11/2001 | Alanara et al. |
| 2002/0002052 A1 | 1/2002 | McHenry |
| 2002/0196842 A1 | 12/2002 | Onggosanusi et al. |
| 2003/0020651 A1 | 1/2003 | Crilly et al. |
| 2003/0027577 A1 | 2/2003 | Brown et al. |
| 2003/0081628 A1 | 5/2003 | Sugar et al. |
| 2003/0099218 A1 | 5/2003 | Tillotson |
| 2003/0165187 A1 | 9/2003 | Tesfai et al. |
| 2003/0181173 A1 | 9/2003 | Sugar et al. |
| 2003/0181211 A1 | 9/2003 | Razavilar et al. |
| 2003/0181213 A1 | 9/2003 | Sugar et al. |
| 2003/0198200 A1 | 10/2003 | Diener et al. |
| 2003/0203743 A1 | 10/2003 | Sugar et al. |
| 2004/0017268 A1 | 1/2004 | Rogers |
| 2004/0023674 A1 | 2/2004 | Miller |
| 2004/0047324 A1 | 3/2004 | Diener |
| 2004/0072546 A1 | 4/2004 | Sugar et al. |
| 2004/0121753 A1 | 6/2004 | Sugar et al. |
| 2004/0136466 A1 | 7/2004 | Tesfai et al. |
| 2004/0142696 A1 | 7/2004 | Saunders et al. |
| 2004/0203474 A1 | 10/2004 | Miller et al. |
| 2004/0203826 A1 | 10/2004 | Sugar et al. |
| 2004/0219885 A1* | 11/2004 | Sugar ............... H04B 17/309 455/67.11 |
| 2004/0233972 A1* | 11/2004 | Karaoguz ............ H04B 1/719 375/130 |
| 2005/0070294 A1 | 3/2005 | Lyle et al. |
| 2005/0119006 A1 | 6/2005 | Cave et al. |
| 2005/0192011 A1 | 9/2005 | Hong et al. |
| 2005/0192016 A1 | 9/2005 | Zimmermann et al. |
| 2005/0213580 A1 | 9/2005 | Mayer et al. |
| 2005/0213763 A1 | 9/2005 | Owen et al. |
| 2005/0270218 A1 | 12/2005 | Chiodini |
| 2006/0075467 A1 | 4/2006 | Sanda et al. |
| 2006/0153281 A1 | 7/2006 | Karlsson |
| 2006/0161428 A1 | 7/2006 | Fouret |
| 2006/0211395 A1 | 9/2006 | Waltho |
| 2006/0220944 A1 | 10/2006 | Ikeda |
| 2006/0234716 A1 | 10/2006 | Vesterinen et al. |
| 2006/0246836 A1 | 11/2006 | Simon |
| 2006/0247505 A1 | 11/2006 | Siddiqui |
| 2006/0267259 A1 | 11/2006 | Hatakeyama et al. |
| 2006/0270371 A1* | 11/2006 | Sugar ............... H04B 17/327 455/226.1 |
| 2007/0008875 A1 | 1/2007 | Gerhardt et al. |
| 2007/0019603 A1 | 1/2007 | Gerhardt et al. |
| 2007/0046467 A1 | 3/2007 | Chakraborty et al. |
| 2007/0047474 A1 | 3/2007 | Anderson |
| 2007/0047494 A1* | 3/2007 | Cordone ............. H04B 1/1036 370/335 |
| 2007/0053410 A1 | 3/2007 | Mahonen et al. |
| 2007/0076745 A1 | 4/2007 | Manjeshwar et al. |
| 2007/0091839 A1 | 4/2007 | Abdelhamid et al. |
| 2007/0091998 A1 | 4/2007 | Woo et al. |
| 2007/0100922 A1 | 5/2007 | Ashish |
| 2007/0165577 A1 | 7/2007 | Baker et al. |
| 2007/0165664 A1 | 7/2007 | Gerhardt et al. |
| 2007/0165695 A1 | 7/2007 | Gerhardt et al. |
| 2007/0173199 A1* | 7/2007 | Sinha .................. H04W 16/10 455/67.11 |
| 2007/0183338 A1 | 8/2007 | Singh et al. |
| 2007/0253394 A1 | 11/2007 | Horiguchi et al. |
| 2007/0254596 A1 | 11/2007 | Corson et al. |
| 2008/0010040 A1 | 1/2008 | McGehee |
| 2008/0014880 A1 | 1/2008 | Hyon et al. |
| 2008/0031143 A1 | 2/2008 | Ostrosky |
| 2008/0069079 A1 | 3/2008 | Jacobs |
| 2008/0192864 A1 | 8/2008 | Szajnowski |
| 2008/0228446 A1 | 9/2008 | Baraniuk et al. |
| 2008/0259859 A1 | 10/2008 | Cordeiro et al. |
| 2008/0261537 A1 | 10/2008 | Chen |
| 2008/0267259 A1 | 10/2008 | Budampati et al. |
| 2008/0284648 A1 | 11/2008 | Takada et al. |
| 2009/0040986 A1 | 2/2009 | Cordeiro et al. |
| 2009/0074033 A1 | 3/2009 | Kattwinkel |
| 2009/0161610 A1 | 6/2009 | Kang et al. |
| 2009/0190508 A1 | 7/2009 | Kattwinkel |
| 2009/0252178 A1 | 10/2009 | Huttunen et al. |
| 2010/0008312 A1 | 1/2010 | Viswanath |
| 2010/0220618 A1 | 9/2010 | Kwon et al. |
| 2010/0296078 A1 | 11/2010 | Forrer et al. |
| 2011/0051645 A1 | 3/2011 | Hong et al. |

FOREIGN PATENT DOCUMENTS

| | | |
|---|---|---|
| KR | WO 2007/058490 A1 | 5/2007 |
| KR | WO 2007/094604 A1 | 8/2007 |
| WO | WO 2006/101489 A1 | 9/2006 |
| WO | WO 2007/034461 A2 | 3/2007 |
| WO | WO 2007/096819 A2 | 8/2007 |
| WO | WO 2007/108963 A2 | 9/2007 |
| WO | WO 2007/108966 A2 | 9/2007 |
| WO | WO 2007/109169 A2 | 9/2007 |
| WO | WO 2007/109170 A2 | 9/2007 |

OTHER PUBLICATIONS

Office Action dated Mar. 27, 2017 as received in EP Application No. 08855797.0.

* cited by examiner

METHODS FOR DETECTING AND CLASSIFYING SIGNALS TRANSMITTED OVER A RADIO FREQUENCY SPECTRUM

This application is a continuation of application Ser. No. 13/286,745 filed Nov. 1, 2011, entitled "Methods for Detecting and Classifying Signals Transmitted Over a Radio Frequency Spectrum", which is a divisional of application Ser. No. 11/839,503 filed Aug. 15, 2007, entitled "Methods for Detecting and Classifying Signals Transmitted Over a Radio Frequency Spectrum", the contents of which are hereby incorporated herein by reference in their entirety.

GOVERNMENT INTERESTS

The work leading to this invention was funded in part by the Defense Advanced Research Projects Agency (DARPA), grant number: FA8750-05-C-0150. The U.S. Government may have certain rights in this invention.

TECHNICAL FIELD

The following is related to detecting and classifying signals on channels within a spectrum of interest, and more particularly to performing signal detection and classification based on detector scans.

BACKGROUND

Wireless networks enable connectivity between different stations, nodes and the like. The different stations may reside in different locations and operate on designated frequency channels. The number of channel allocations available depends on the total amount of designated spectrum and spectrum availability.

Some networks are allowed to operate in any channel within the designated frequency spectrums as long as the channel or channels are not being used. Channels occupied by the transmission sources already operating within the designated spectrum range are to be detected and classified by transmitted signal type. Further, identification of target signals is required for network setup. The signals other than target signals are referred to as non-cooperative (NC) signals.

Errors in the detection and classification processes result in potential interference with other transmission sources and inefficiencies in target network operations. If a channel is classified incorrectly as having "No signal", then the station operating in this channel will cause interference with other NC networks or NC transmitters that are not part of the station's network. If the target signal in a channel is misclassified as any other type, the network setup or operations will be compromised.

BRIEF DESCRIPTION OF THE DRAWINGS

The accompanying drawings are included to provide further understanding of the invention and constitute a part of the specification. The figures listed below illustrate embodiments of the invention, and, together with the following description, serve to explain the subject matter of the invention.

DETAILED DESCRIPTION

Overview

Figure 1:
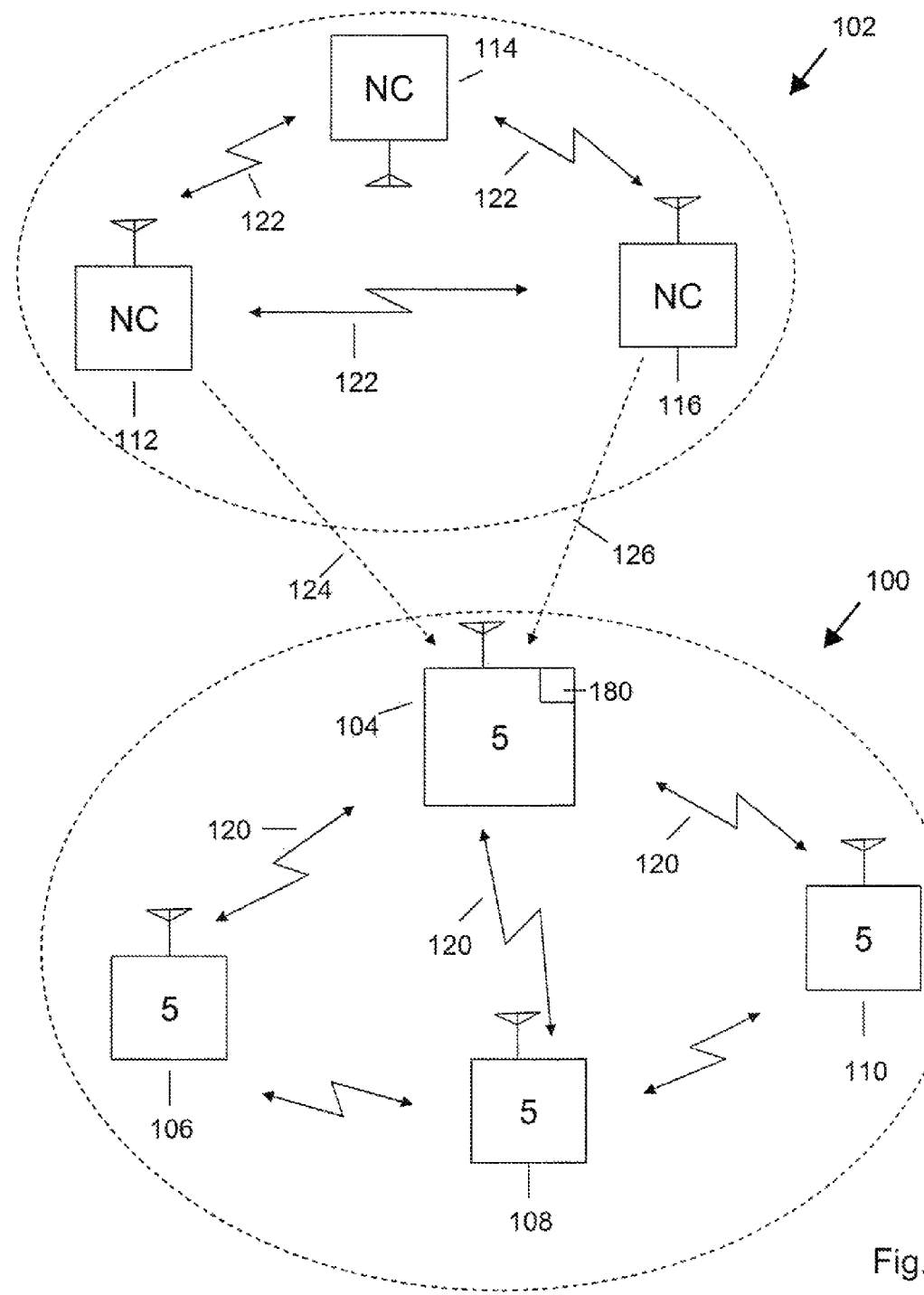
FIG. 1 illustrates radios and stations according to the disclosed embodiments.

The systems and methods described herein can detect and classify signals with a detector. Using classification algorithms, the detector determines whether the signal is present and, if a signal is present, the type of signal. Thus, the detector can be configured to monitor the spectrum over a frequency range of interest for signals of interest, which are referred to as target signals. An example target signal is a next generation (XG) signal. A target signal, however, is not limited to XG signal and can be any signal of interest of any type.

The methods for detection and classification described herein can be implemented using a cognitive radio. A cognitive radio capable of performing the disclosed methods is described in co-pending patent application titled "SYSTEMS AND METHODS FOR. A COGNITIVE RADIO HAVING ADAPTABLE CHARACTERISTICS," U.S. patent application Ser. No. 11/839,496 filed on Aug. 15, 2007, the contents of which are hereby incorporated by reference in their entirety.

A station actively participating in a network strives to detect non-cooperative signals as early as possible to avoid causing interference with other transmission sources. Further, the network should correctly identify a detected signal as a target signal or a non-cooperative signal.

The methods and algorithms implemented by the detector perform signal detection and classification based on a number of most recent detector spectrum scans utilizing a multi-stage classification procedure using spectrum masks and a multi-level threshold structure. The spectrum of interest is sub-divided into regions of size equal to the minimum target channel size. These regions also are referred to as "channels." The channels may be contiguous.

The detection and classification of potential signals are performed in stages on a channel-by-channel basis. A first stage detects narrow-band signals, defined as signal bandwidths less than the minimum target signal bandwidth, based on the spectrum power profile computed using the last detector scan. A second stage executes when no narrowband signal is detected using the first stage disclosed above. During the second stage, embodiments of the present invention apply max-hold power spectrums computed using a number of spectrum power profiles determined using the last multiple number of detector scans. The max-hold spectrum power refers to the resulting envelope of the multiple overlaying spectrum power profiles. The second stage classifies signals in channels that have not been filtered out as narrowband channels during the first classification stage as target, wideband NC [non-cooperative] or "no" signals.

In some embodiments, a method for classifying a signal within a channel can be performed. The method includes classifying a signal as a narrowband signal by applying a first threshold and a second threshold. The second threshold is lower than the first threshold. The method also includes, if the signal is not a narrowband signal, classifying the signal as a target signal by applying a mask to the channel to determine a degree of correlation between the mask and the target signal. The method also includes, if the signal is not a narrowband or target signal, classifying the signal as a wideband signal.

In some embodiments, a method for detecting a narrowband signal within a channel is performed. The method includes applying a first threshold to a signal in a channel. The method also includes determining whether the signal is a narrowband signal according to the threshold. The method also includes applying a second threshold to the signal. The method also includes confirming the signal is the narrowband signal according to the second threshold.

In some embodiments, a method for detecting a wideband signal within a channel is performed. The method includes applying a first threshold to a signal within the channel. The method also includes determining the signal is a wideband signal according to the first threshold. The method also includes applying a second threshold to the signal if the first threshold indicates that signal is not a wideband signal. The method also includes confirming the signal is not the wideband signal according to the second threshold.

In some embodiments, a method for detecting a target signal is performed. The method includes determining whether a signal is a narrowband signal. The method also includes determining whether the signal is a wideband signal if the signal is not the narrowband signal. The method also includes applying a channel mask to the signal if the signal is not the narrowband signal or the wideband signal. The method also includes determining whether the signal is a target signal. The target signal correlates to the channel mask.

Detection and Classification

In some embodiments, detection and classification can be performed by determining the presence of a narrowband signal in at least one channel. Spectrum can be examined on a channel by channel basis. In such embodiments, the presence of the signal can be determined by hard limiting spectrum power profile components within the channel using a first narrowband amplitude threshold. Subsequently, the narrowband signal presence within a channel is identified by an exclusion based on the comparison of the hard-limited spectrum power profile against the narrowest target signal spectrum mask using a minimum bandwidth threshold as test criteria.

The absence of a narrowband signal in a channel is confirmed by repeating the hard limiting step above using a second narrowband amplitude threshold. The second narrowband amplitude threshold is lower than the first narrowband amplitude threshold. The second hard-limited spectrum power profile is then compared to a second threshold using a minimum bandwidth threshold as test criteria to confirm the absence of a narrowband signal. The narrowband signal presence determination classifies narrowband conformant signals as "narrowband signals."

The detection and classification steps also include pre-classifying narrowband non-conformant signals, if any, as wideband signal candidates and proceeding with further classification steps disclosed below. A further classification step includes computing an envelope of spectrum power profile across a frequency range of interest using N single-scan spectrums power profiles by using data collected during last N detector scans.

Steps for determining the presence of a wideband signal includes hard limiting max-hold spectrum power profile components using the first wideband amplitude threshold. The steps also include identifying potential wideband candidates within a channel by exclusion based on the comparison of the hard limited spectrum components computed above against the narrowest target signal spectrum mask using a minimum bandwidth threshold as test criteria.

Additional steps for determining the presence of the wideband signal can include confirming non-compliant wideband candidates determined previously by repeating the hard limiting step disclosed above using a second wideband amplitude threshold that is lower than the first threshold disclosed above and comparing the second hard-limited spectrum power profile to the narrowest target signal spectrum mask using a minimum bandwidth threshold. The steps also include classifying the resulting wideband nonconformant candidates into a "no-signal" category.

Other steps for classifying a signal includes classifying wideband conformant signals as target signal candidates and proceeding with further classification steps as disclosed below. The following steps for classification include identifying a target signal spanning a single channel using the correlation of the hard-limited max-hold power spectrum computed using a first wideband amplitude threshold and the narrowest target signal channel mask comprising a target signal spectrum power mask and a guard band mask.

The steps for wideband conformant classification also includes, for at least one target signal type spanning multiple channels, identifying target signals of a type using multi-channel segments of the max-hold power spectrum computed in the steps disclosed above and the target signal channel masks of the target signal type comprising target signal spectrum profiles and guard bands, and classifying target signal conformant signals as "target signals" of the type given by the matching channel masks. The steps also include classifying target signal non-conformant signals as "wideband non-cooperative signals."

FIG. 1 depicts radios and stations used in networks according to the disclosed embodiments. FIG. 1 shows two networks 100 and 102. Preferably, network 100 may be a network that operates within a frequency spectrum that is available and not being used by other networks, transmitters, stations and the like. For example, network 102 may be referred to as a non-cooperative (NC) network that mayor may not operate within the frequency spectrum available to network 100.

Both networks 100 and 102 include radios or stations that communicate with each other. For example, station 104 transmits and receives signals from stations 106, 108 and 110. Stations 104-110 may operate on the same channel so that each station is tuned to the same frequency. Stations 104-110 comprise network 100. Station 104 also includes detector 180 that detects and classifies signals 120.

Network 102 includes stations 112, 114 and 116. Stations 112-116 transmit and receive signals 122 from each other. Due to the proximity of the networks, some signals from network 102 reach stations within network 100. For example, station 104 receives NC signals 124 and 126. Further, NC signals 124 and 126 are not necessarily identical. For example, NC signal 124 is a narrowband NC signal and signal 126 is a wideband. NC signal. Detector 180 detects and classifies NC signals 124 and 126.

Figure 2:
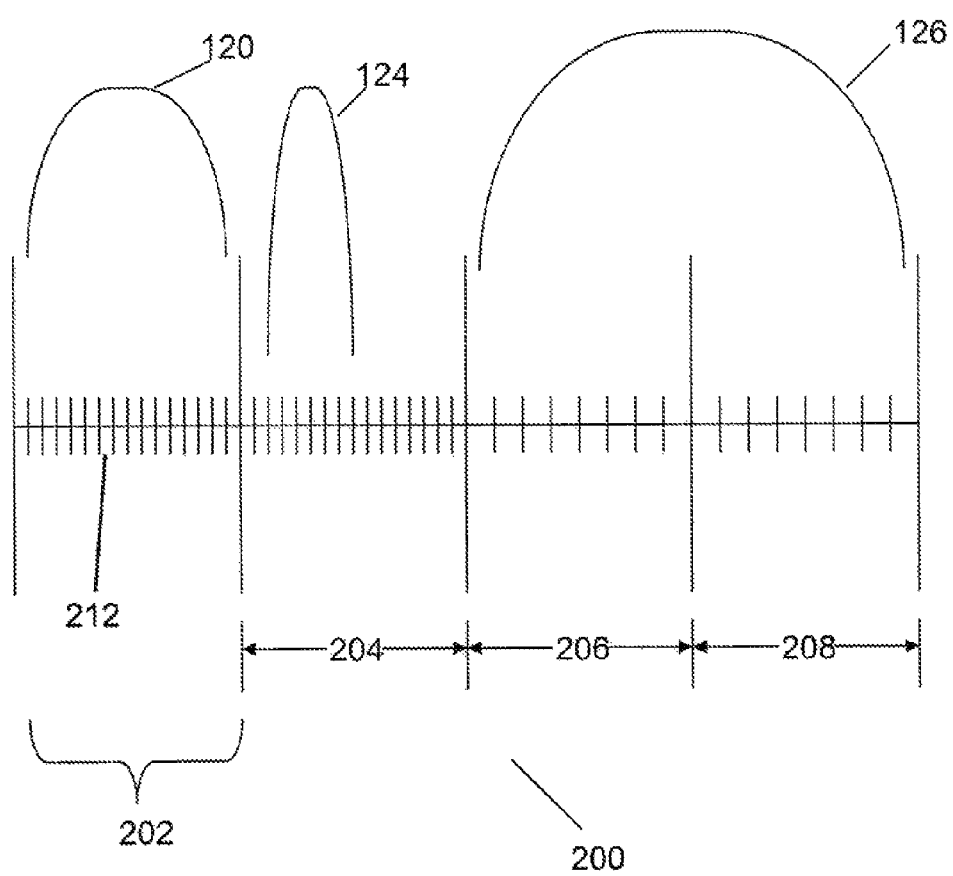
FIG. 2 illustrates a set of channels within a spectrum of interest according to the disclosed embodiments.

FIG. 2 depicts a set of channels within a spectrum of interest according to the disclosed embodiments. Spectrum 200 includes a range within a frequency band that is of interest and possibly available to network 100. Spectrum 200 includes channels 202, 204, 206 and 208, and also may include additional channels that are not shown. Channels in spectrum 200 may be contiguous and/or overlapping. Channel 202 encompasses a frequency range within spectrum 200. The other channels shown by FIG. 2 are similar to channel 202. The signals detected within spectrum 200 may have smaller or larger bandwidth than bandwidth of channels 202-208.

The size of channel 202 is selected to correspond with the size of the smallest target signal. For example, if the bandwidth for the smallest target signal is about 1.75 MHz, then the bandwidth for channel 202 is about 2 MHz. A larger target signal is about 3.5, MHz, so that two 2 MHz channels are occupied by the target signal. Another target signal could be about 7 MHz and occupy four 2 MHz channels.

A detector according to the present invention scans spectrum 200 and measures the energy within a sequence of bins to determine the presence of a potential signal. The size of the bins depends on a desired detector resolution. Energy within a bin, such as bin 212, corresponds to the strength of a signal present within the frequency range of the bandwidth of the bin.

As disclosed above, the potential target signals 120 are classified into different types of signals, such as target signals, narrowband NC signals or wideband NC signals, or no signal. A potential signal is classified as "no signal" if the measured signal energy does not meet criteria for classification to the types.

The spectrum of the narrowest target signal 120 is contained within channel 202. The width of the signal's power spectrum, centered in the middle of the channel, is narrower than the channel width. The spectrum regions within the channel 202 to the left and to the right of target signal's spectrum are called guard bands.

Other types of signals include NC signals from a non-cooperative source, such as a station operating in NC network 104. NC signals can have varying bandwidths and operate within different frequency ranges, even within spectrum 200. Referring to FIG. 2, narrowband NC signal 124 within channel 204 indicates a narrowband NC signal having a bandwidth smaller than the minimum bandwidth of the target signal or having spectrum mask different from target signal. "Narrowband" relates to the bandwidth of the signal to detect relative to the bandwidth of the smallest target signal, and not to the NC signal itself. Multiple narrowband NC signals 124 may occupy channel 204.

Wideband NC signal 126 represents a wideband NC signal that occupies a portion of spectrum 200 occupying, or spanning, more than one channel. For example, signal 126 occupies spectrum over channels 206 and 208. According to the disclosed embodiments, if a signal is not determined to be a target signal, a narrowband NC signal or "no signal," then the signal is classified as a wideband NC signal. Referring back to FIG. 1, detector 180 implements an algorithm to detect and classify signals based on their power spectrum profile.

FIGS. 3 and 3A-C depict flowcharts for detecting and classifying a signal according to the disclosed embodiments. The steps disclosed by the flowchart may be implemented as steps within a program executable on a processor and stored on a computer-readable medium. The steps may be executed by detector 180 and/or station 104, disclosed above. Further, the steps disclosed below are general in nature such that variations may be made that are within the scope of the present invention.

Figure 3:
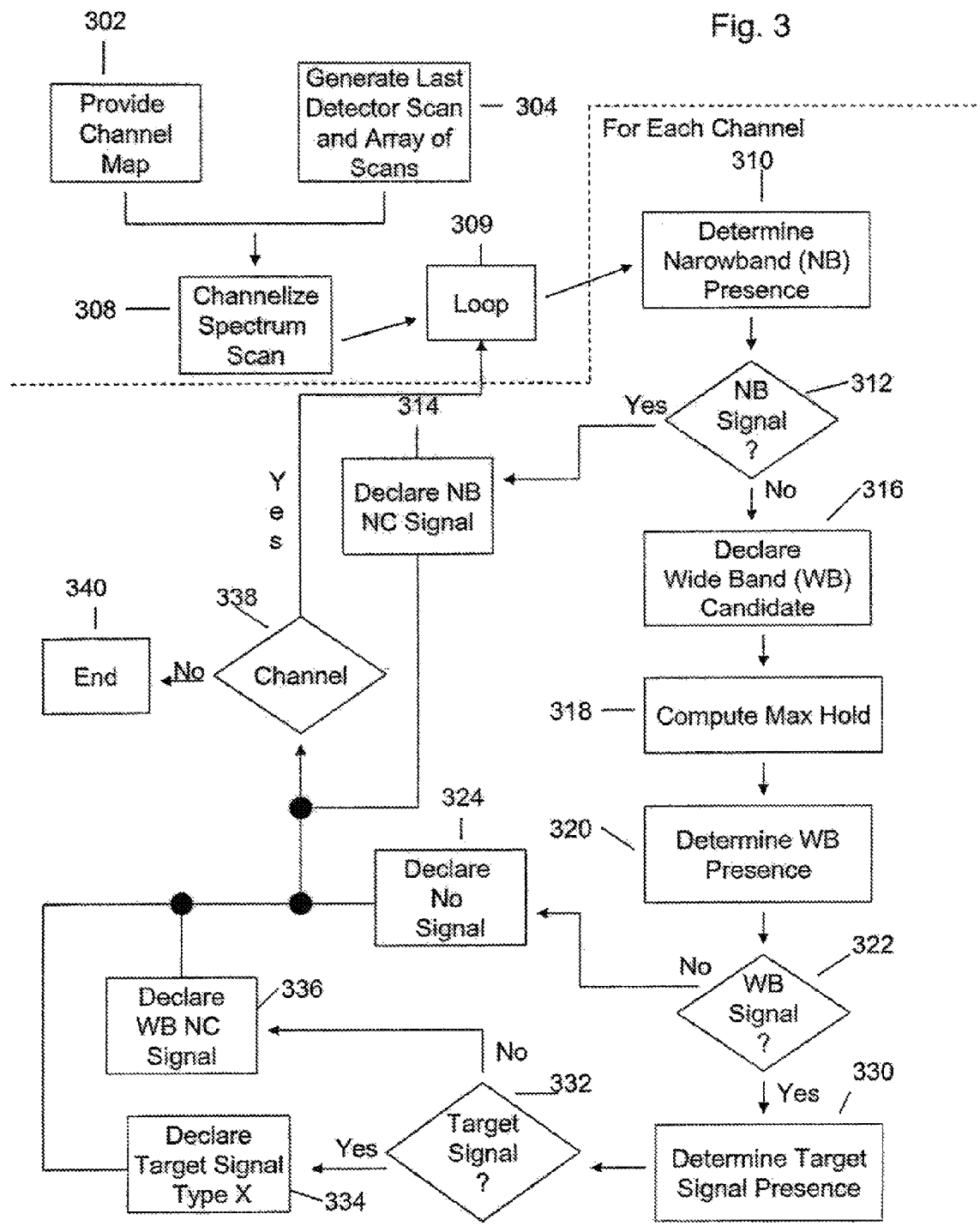
FIG. 3 illustrates a flowchart for identifying and classifying a signal according to the disclosed embodiments.

Referring to FIG. 3, step 302 executes by providing a channel map for the spectrum of interest, such as spectrum 200. Step 304 executes by generating the last detector scan and an array of scans of the spectrum. The array of scans may be any number of scans performed by a detector over a period of time.

Step 308 executes by channelizing the spectrum scan. In other words, the scan of the spectrum of interest is broken into channels having a predetermined bandwidth and frequency boundaries. For example, if a channel has a 2 MHz bandwidth, then the spectrum may be channelized into 2 MHz channels centered around frequency $fc=(2*n+1)$ MHz (where n is positive integer) for analysis. Channels can be overlapping in frequency with multiple successive channels. Step 309 executes by looping to the next channel within spectrum 200.

Steps 310 to 338 disclose the analysis and processes executed for each channel. After each channel, the flowchart of FIG. 3 returns to step 309, except for the last channel. Thus, step 310 executes by determining a narrowband (NB) signal presence within the channel. This step is disclosed in greater detail by FIG. 3A. Step 312 executes by determining whether a narrowband signal is detected within the channel. If a narrowband signal is present, then it should occupy a fraction of the channel. If yes, then step 314 executes by declaring the signal detected within a channel as narrowband non-cooperative signal.

If step 312 is no, then step 316 executes by declaring the channel to be a candidate to have a wideband (WB) signal. Step 318 executes by computing the max hold power spectrum across the spectrum. The computation uses data of signal power levels collected during a number of detectors scans. Thus, the max hold is a representation of spectrum as measured. Because multipath and fading channel properties may change from scan to scan, the overlaying of several scans allows the resultant representation to have a more precise picture of signals and power levels within a channel.

Step 320 executes by determining wideband signal presence in the channel. This step is disclosed in greater detail by FIG. 3B. Step 322 executes by determining whether a wideband signal is present within the channel. If no, then step 324 executes by declaring no signal is within the channel.

If yes, then step 330 executes by determining target signal presence within the channel. Before declaring a wideband signal presence, the disclosed embodiments confirm the detected signal is not a target signal. This step is disclosed in greater detail by FIG. 3C. Step 332 executes by determining whether a target signal is present within the channel.

If yes, then step 334 executes by declaring the detection of a target signal in the channel. Various types of target signals may be present, so the disclosed embodiments also determining the type of target signal. If no, then step 336 executes by declaring the signal detected in the channel as wideband non-cooperative signal. Step 338 executes by determining whether another channel is left to analyze in spectrum 200. If not, then step 340 executes by ending the flowchart. If yes, then the flowchart goes back to step 309 and loops to the next channel.

Figure 3A:
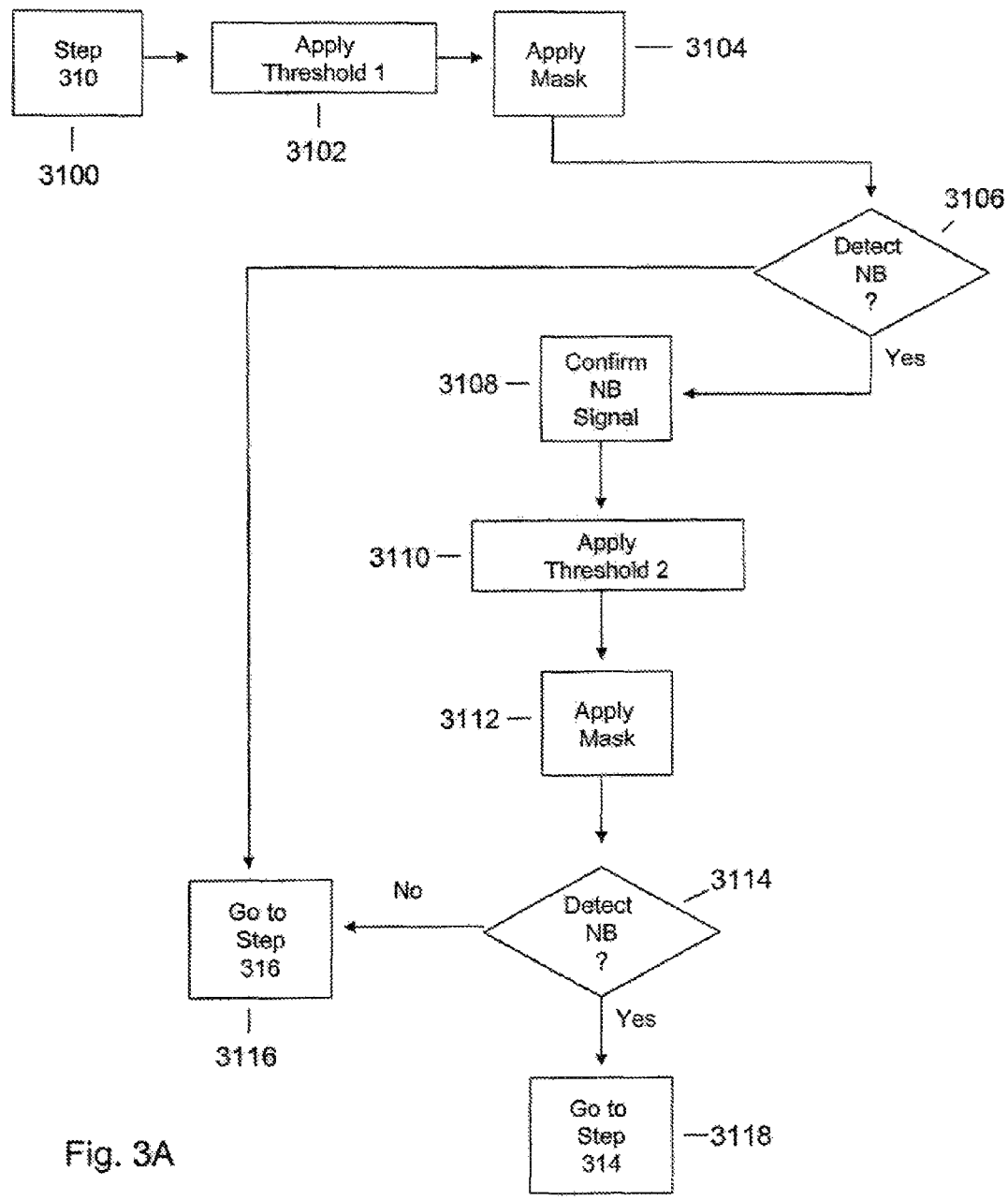
FIG. 3A continues the flowchart of FIG. 3.

FIG. 3A depicts a flowchart for executing the narrowband detection of FIG. 3. FIG. 3A discloses steps 310 and 312 of FIG. 3 in greater detail. As disclosed above, a narrowband signal is a non-cooperative signal that occupies a fraction of a channel. Examples of NC narrowband signals are now described.

A graph can depict signal spectrum power over a frequency range, or spectrum. The vertical axis of the graph shows the s power (P) while the horizontal axis shows the frequency (f). Other channels also may be within the spectrum.

Two NC signals occupy the channel and are centered on frequencies f3 and f4, respectively. A threshold T1 designates the power level needed for detection of signal within channel 202. Power levels above threshold T1 indicate the presence of a signal. The bandwidth of NB signals is less than the smallest bandwidth of target signal as spectrum mask M1.

Returning to FIG. 3A, step 3100 executes by indicating step 310 has been accessed. Thus, a narrowband presence determination is to be performed. Step 3102 executes by applying threshold T1 to the channel. Step 3102 hard limits any signals within the channel with threshold T1. Step 3104 executes by applying mask M1 to the hard-limited channel spectrum.

Step 3106 executes by determining whether any narrowband NC signals were detected in the channel. A narrowband. NC signal is detected based on degree of correlation of the channel power spectrum hard-limited using threshold T1 and the target signal mask M1. If yes, then step 3108 executes to confirming the presence of the narrowband signal. The confirmation prevents a potential misclassification if parts of a wideband or target signal are above threshold T1. The parts of the signal above threshold T1 may appear as narrowband signals. Confirmation is performed by applying another threshold and same mask so that misclassifications are prevented.

Similar to step 3102, step 3110 executes by applying a second threshold T2 to confirm the presence of a narrowband signal. The second threshold T2, however, is lower than the first threshold T1 in order to detect weaker target signal. The confirmation prevents the potential misclassification when parts of the target signal are above the first threshold. Step 3112 executes by applying mask M1 as before to the power spectrum hard-limited using threshold T2.

Another graph can be described for a signal found using threshold T2, having a vertical axis for power (P) and a horizontal axis for frequency (f). The frequency axis includes channel 202 between frequencies f1 and f2. A target signal occurs in channel 202. The target signal includes peaks having power levels above threshold T1. Hard-limiting the signal using threshold T1 makes the signal appear as three narrowband signals because a small fraction of its spectrum components exceeds the threshold T1.

Thus, the threshold is lowered to threshold T2. Threshold T2 is placed at a power level lower than threshold T1. For example, threshold T2 may be a percentage reduction in power from threshold T1. Alternatively, threshold T2 is set at a fixed value lower than threshold T1. Applying threshold. T2, the percentage of signal power above the threshold shows that the target signal is not a narrowband signal. Thus, the target signal will not be misclassified as a narrowband signal.

Referring back to FIG. 3A, step 3114 executes by determining whether the signal or signals in the channel pass the criteria for a narrowband signal in view of threshold T2. As before, signal is classified as narrowband signal based on degree of correlation between the hard-limited signal spectrum and mask M1. If signal is not classified as narrowband, then step 3116 is executed by returning to the flowchart of FIG. 3, and going to step 316. The signal detected in the channel is declared a wideband candidate signal, and undergoes additional analysis prior to classification. If yes, then step 3118 is executed by returning the flowchart of FIG. 3 and going to step 314. The signal or signals detected in the channel are declared narrowband NC signals as a result of "passing" mask correlation tests using thresholds T1 and T2.

Thus, the flowchart of FIG. 3A serves to disclose a method or process for excluding narrowband NC signals from further classification analysis. If the detected signal is not a narrowband signal, then additional steps are taken before classification of the signal.

Figure 3B:
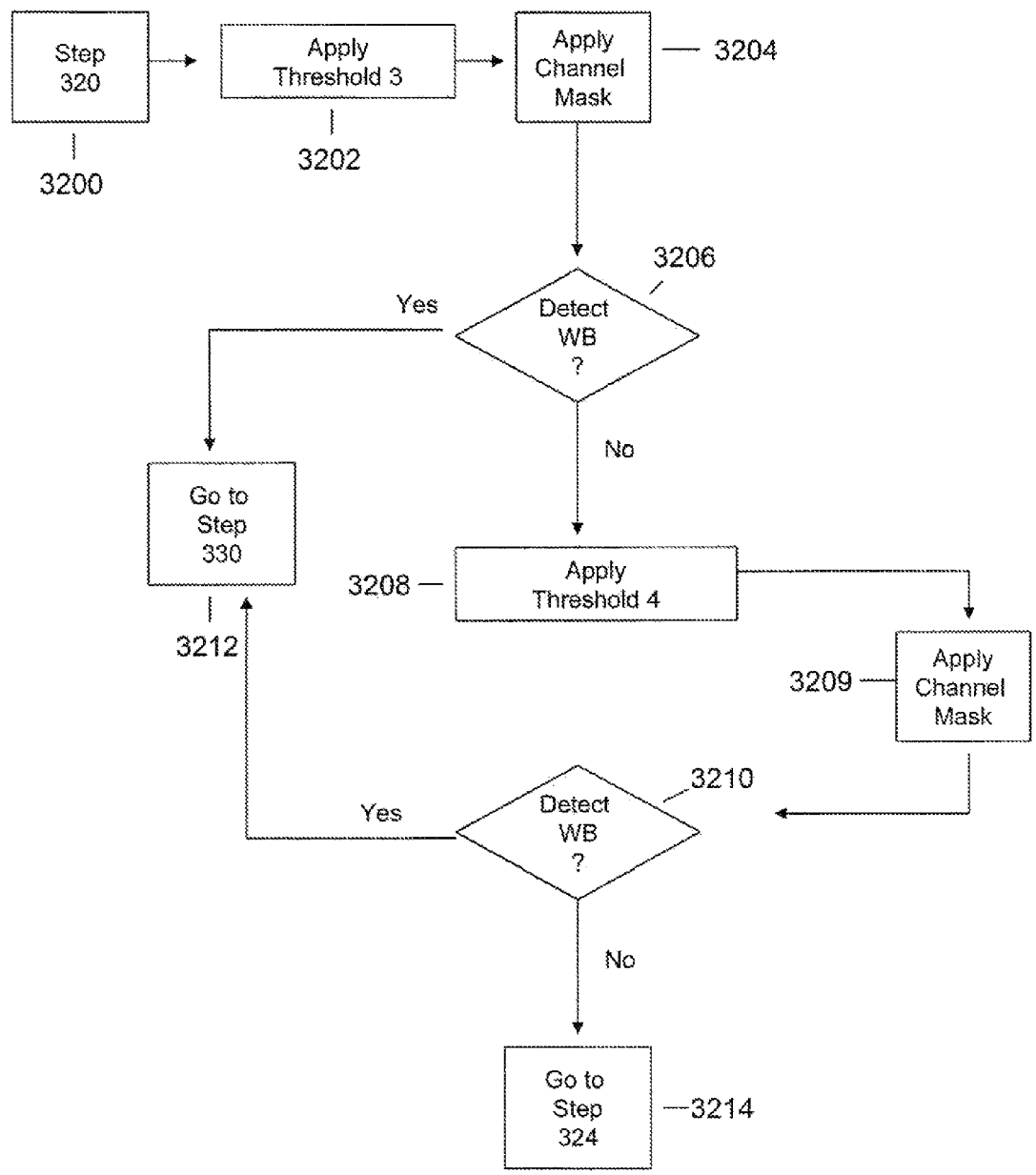
FIG. 3B continues the flowchart of FIG. 3.

FIG. 3B depicts a flowchart for executing the wideband analysis of FIG. 3. FIG. 3B discloses steps 320 and 322 in greater detail. Step 3200 executes by indicating step 320 has been accessed. Thus, a wideband signal presence determination is to be performed. Step 3202 executes by applying threshold T3 to the max hold power spectrum computed in step 318 of FIG. 3. Unlike the narrowband analysis, the applicable threshold depends upon the max-hold overlays instead of a single detector scan. As noted above, the max hold is a representation of the spectrum as measured.

Step 3204 executes by applying a channel mask to the max hold power spectrum. A high degree of correlation between the measured channel spectrum power and the channel mask indicates a high probability of the desired signal. In other words, the degree of matching the measured spectrum to the channel mask is used to determine if a target signal is present.

Figure 4:
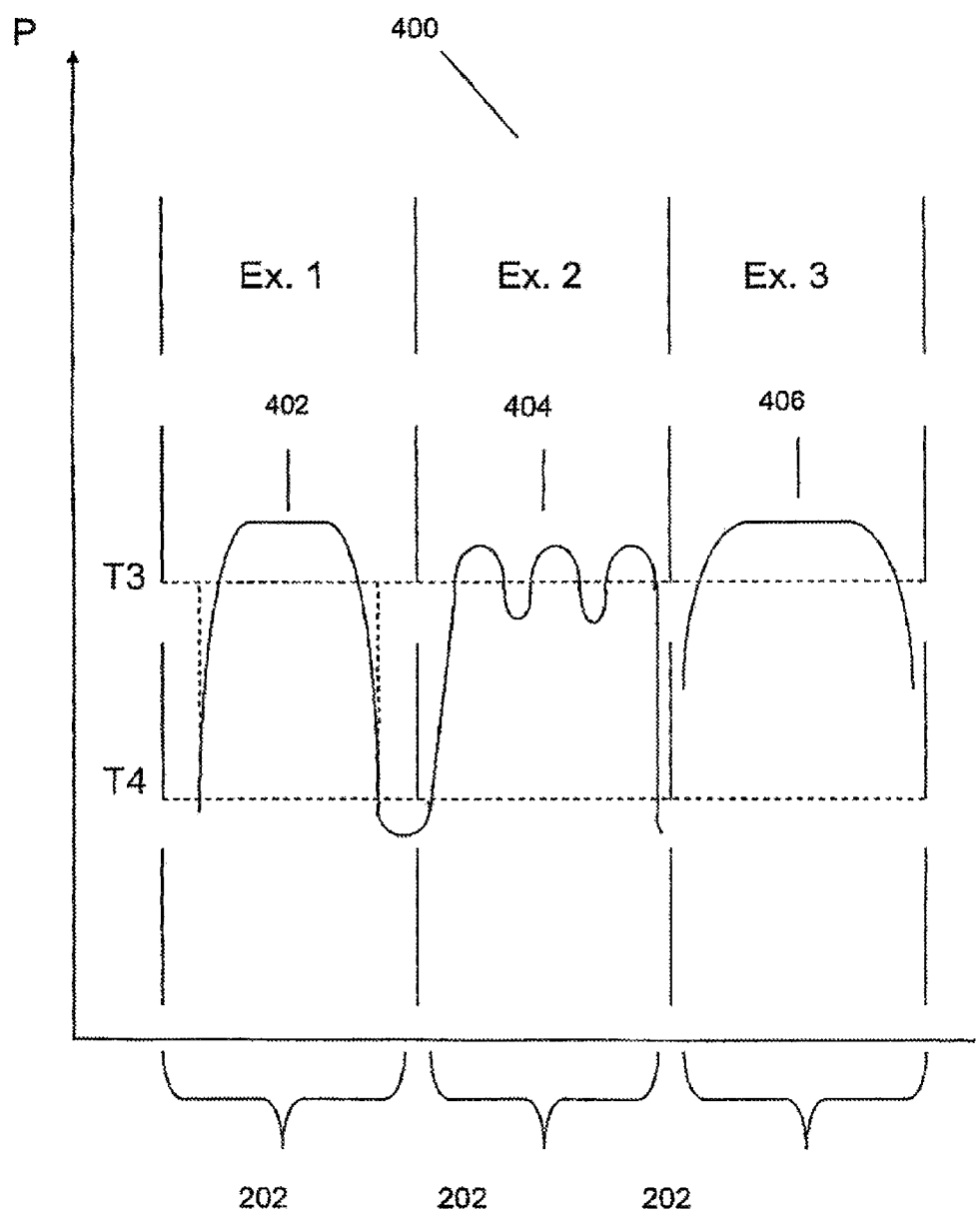
FIG. 4 depicts a graph showing power and frequency characteristics according to the disclosed embodiments.

Referring to FIG. 4, graph 400 shows the measured spectrum power over a frequency spectrum. Power (P) is shown on the vertical axis and frequency (f) is shown on the horizontal axis. Signal 402 occurs within channel 202. Signal 402 has been determined to not be a narrowband signal by the disclosed process, and may be classified as a target signal, wideband signal or noise ("no signal"). In classifying signal 402, the channel 202 spectrum power is hard-limited using threshold T3.

The hard-limited spectrum is correlated with a channel mask for further signal classification. The threshold value impacts the shape of the hard-limited channel spectrum profile and thus the correlation output. FIG. 4 shows three examples of a signal within channel 202 to illustrate how threshold value affects the classification.

Referring to FIG. 4, thresholds T3 and T4 are applied much like thresholds T1 and T2 disclosed above. Threshold T4 is set lower than threshold T3 to detect weaker signals.

Example 1 shows a target signal and its relation to thresholds T3 and T4. Example 2 shows a signal that would be misclassified as noise when threshold T3 is applied. When spectrum in Example 2 is hard-limited using threshold T3 it will poorly correlate with the channel mask resulting in "noise" classification. Using the lower threshold value T4 would yield the proper representation of the channel spectrum by its hard-limited replica resulting in high correlation of channel spectrum with channel mask. Misclassification, therefore, is avoided when threshold T4 is applied. Therefore, in example 2, threshold T3 would improperly classify target signal 404 as noise, while threshold. T4 would prevent misclassification.

Example 3 of FIG. 4 shows a different scenario where a target signal 406 is within channel 202. This example illustrates when signal is emitted by a nearby transmitter yielding significant energy in the adjacent spectrum. In this example, using threshold T3 would result in an accurate representation of channel spectrum, while using threshold. T4 will obscure the guard bands leading to misclassification of target signal as a wideband signal 406 takes up most of the channel.

Examples 2 and 3 illustrate why two thresholds are necessary for wideband signal detection.

Step 3206 executes by determining whether the signal is classified as a wideband signal according to the results generated from applying threshold T3 and the appropriate mask. If yes, then step 3212 is executed. If not, then step 3208 executes by applying a lower threshold T4 to ensure that a wideband signal in channel 202 is not misclassified as "no signal."

Step 3209 executes by applying a channel mask, as disclosed above, again to determine the correlation between the appropriate mask and the detected power in the channel. Step 3210 executes by determining whether the pre-classified wideband signals classified as a wideband signal according to the results generated from applying threshold T4 and the appropriate mask.

Step 3210 is similar to step 3206 except the percentage of signal power in the spectrum, or channel 202, above threshold T4 should be different if a signal is present. If no, then step 3214 executes by classifying the power within the channel as noise or "no signal," and goes to step 324 in FIG. 3. If step 3210 is yes, then step 3212 executes by determining the presence of a wideband or target signal in the channel and goes to step 330 in FIG. 3.

Figure 3C:
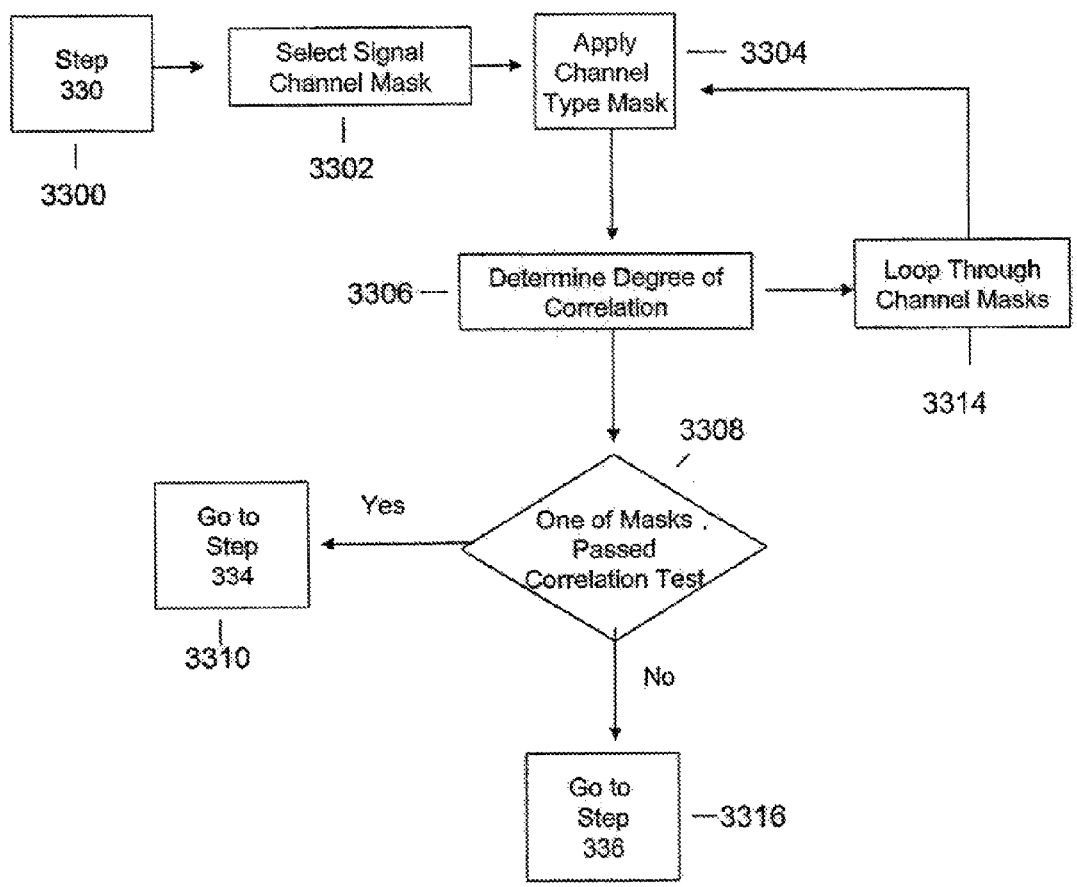
FIG. 3C continues the flowchart of FIG. 3.

FIG. 3C depicts a flowchart for executing the target signal analysis of FIG. 3. FIG. 3C discloses steps 330 and 332 in greater detail. At this point, the power detected in the channel, such as channel 202 in FIG. 4, may be either a target signal or NC signal. The process will apply various masks to the signal to determine if it is a target signal. If not, then the signal is classified as NC signal. Step 3300 executes by indicating step 330 has been accessed. Thus, a target signal presence determination is to be performed.

Step 3302 executes by selecting a target signal channel mask from a plurality of target signal channel masks. The target signal channel masks correspond to the different types of target signals that might be found operating in the channel. For example, referring to FIG. 4, mask M2 is a target signal channel mask for a 1.75 MHz target signal. Step 3304 executes by applying the target signal channel mask to the signal determined in step 322 to be within the channel.

Step 3306 executes by determining the degree of correlation between the signal in the channel and the target signal channel mask. The "area" of the mask is compared to the signal determined in step 322 to be within the channel, as well as mean and variance of the signal and mask. Peak-to-mean ratio, proximity to noise floor as well as other parameters playa part in the decision process. Those parts of the mask that correspond to signal power in the channel signify the degree of a correlation. A high degree of correlation indicates a strong probability that the signal corresponding to the target signal channel mask is present.

Step 3314 executes by applying some or all of the available masks to the signal determined in step 322 to be within the channel and returning to step 3304. Step 3308 executes by determining whether the applied mask matches the signal to a degree that indicates how the signal should be classified. In other words, step 3308 determines whether the degree of correlation between the applied mask and signal power is great enough to classify the signal as the type of signal associated with the mask. If the degree of correlation indicates a match, then step 3310 executes by classifying the signal as the signal type exemplified by the applied mask and going to step 334 in the flowchart of FIG. 3. If the degree of correlation does not indicate a match, then the signal is classified as a wideband NC signal and, at step 3316, processing continues to step 336 in FIG. 3. Thus, at the end of the flowcharts, a detected potential signal is classified as a narrowband or wideband NC signal, a "no signal," or a target signal of a certain type.

Systems and methods for detecting and classifying denial of service (DoS) attacker in a dynamic spectrum access radio are described below. The systems and methods described below can be used for detection, identification and classification of the denial of service (DoS) attacker who seeks to introduce interference into dynamic spectrum access radio communications. Using classification algorithms, the method determines whether the DoS attacker is present and, if an attacker is present, the type of attacker.

Thus, the method monitors (in some embodiments, continuously) the interference level over a frequency range of interest for target signals. The methods and algorithms implemented by the method perform DoS attacker detection and classification based on a number of recent detector spectrum scans, as well as collected and stored spectrum history data. Parameters used in the detection process can include a target radio's statistics relating to signal-to-noise ratio (SNR), receiver signal power level, bit error rate (HER) and others.

A method for classifying a DoS attacker is described below. The method includes using a collected spectrum statistics database to identify the DoS attacker. The detection and classification of potential DoS attackers can be performed in stages. A first stage monitors (in some embodiments, continuously) a target radio's statistical data for a potential presence of DoS attacker. A potential for presence of the DoS attacker exists if target radio's bit error rate (BER) and other communication quality parameters are greater than those under normal mode of operation, even though signal-to-noise ratio (SNR) and power level received from other target radios are sufficient for normal operation.

A second stage executes when potential DoS attacker is detected using the first stage disclosed above. During the second stage, in some embodiments, the previously described statistical database is used to confirm the presence of the DoS attacker as well as to classify the DoS attacker.

The DoS attacker can be classified into three categories—active, re-active and static. For the purposes of classification it is assumed that an active DoS attacker introduces large amounts of interference randomly over large parts of spectrum and executes a DoS attack by virtue of introducing interference over as much continuously varying parts of spectrum as possible. For the purposes of classification it is assumed that a re-active DoS attacker intelligently introduces interference only in parts of spectrum occupied by target signals and executes DoS attack by virtue of identifying and "following" its target signal. For the purposes of classification it is assumed that a static DoS attacker introduces interference only in pre-defined static parts of spectrum.

In order to assist in detection and identification of a potential active or static DoS attacker, the target radio continuously or periodically maintains a database of spectrum history and statistics. The method can be configured to maintain and stores such spectrum statistics as signal occupancy information and detected power level, as well as other statistical data, on a per channel basis.

In order to confirm and classify an active DoS attacker, the second stage analyzes the spectrum statistics collected in the previously described spectrum database. In order for a DoS attacker to be confirmed and classified as active DoS attacker, large amounts of interference must be present over large varying parts of spectrum.

In order to confirm and classify a static DoS attacker, the second stage analyzes the spectrum statistics collected in the previously mentioned spectrum database. In order for a DoS attacker to be confirmed and classified as static DoS attacker, large amounts of interference must be present over static parts of spectrum. The algorithm looks for a degree of correlation among the spectrum data samples inside the spectrum database.

In order to assist in detection and identification of a potential re-active DoS attacker, the target radio maintains a database of how often it has been forced to change frequency of operation and re-establish connection with other target radios due to poor network operation and connectivity. At the same time the radio continues to monitor the frequencies from which it has been forced to move in order to validate whether the introduced interference is actually a useful radio system or an attempted DoS attack.

In order to confirm and classify a re-active DoS attacker, the second stage analyzes the spectrum statistics collected in the above mentioned spectrum database. As described in the definition of a re-active DoS attacker above, in order for a DoS attacker to be confirmed and classified as re-active DoS attacker, a number of connection reestablishment attempts must be present. This signals that a DoS attacker is following the target signal and attempts to introduce interference.

Many specific details of certain embodiments of the invention are set forth in the description and in FIGS. 1-4 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. As used herein, one or more components "coupled" to each other can be coupled directly (i.e., no other components are between the coupled components) or indirectly (i.e., one or more other components can be placed between the coupled components).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined or altered to provide further embodiments.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein.

The terminology used in the Detailed Description is intended to be interpreted in its broadest reasonable manner, even though it is being used in conjunction with a detailed description of certain specific embodiments of the invention. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

The invention claimed is:

1. A dynamic spectrum access device comprising:
a detector configured to measure energy within a plurality of bins, the plurality of bins being within a channel identified by a channelization for a spectrum region of interest, wherein a size of the channel is selected to correspond to an expected size of a target signal; and
a processor configured to:
determine a degree of correlation between the measured energy and a target signal channel mask selected from among a plurality of signal masks; and
responsive to determining that the degree of correlation between the measured energy and the target signal channel mask is not above a correlation threshold:
classify the measured energy as a wide band signal candidate;
generate a max-hold power spectrum based on a plurality of max-hold overlays;
apply a threshold to the max-hold power spectrum; and
apply a channel mask to the max-hold power spectrum to identify the wide band signal candidate as one of: a target signal, a wide band non-cooperative signal, and noise.

2. The dynamic spectrum access device of claim 1, wherein the processor is further configured to determine a degree of correlation between the max-hold power spectrum and the channel mask.

3. The dynamic spectrum access device of claim 1, wherein the process is further configured to select the channelization for the spectrum region of interest and to divide the channel into the plurality of bins.

4. The dynamic spectrum access device of claim 1, wherein the processor is further configured to select the target signal channel mask from among the plurality of signal masks.

5. The dynamic spectrum access device of claim 1, wherein at least one channel identified by the channelization at least partially overlaps at least one other channel identified by the channelization.

6. A method comprising:
measuring, by a spectrum detector, energy within a plurality of bins, the plurality of bins being within a channel identified by a channelization for a spectrum region of interest, wherein a size of the channel is selected to correspond to an expected size of a target signal;
determining a degree of correlation between the measured energy and a target signal channel mask selected from among a plurality of signal masks; and
responsive to determining that the degree of correlation between the measured energy and the target signal channel mask is not above a correlation threshold:
classifying the measured energy as a wide band signal candidate;
generating a max-hold power spectrum based on a plurality of max-hold overlays;
applying a threshold to the max-hold power spectrum; and
applying a channel mask to the max-hold power spectrum to identify the wide band signal candidate as one of: a target signal, a wide band non-cooperative signal, and noise.

7. The method of claim 6, further comprising determining a degree of correlation between the max-hold power spectrum and the channel mask.

8. The method of claim 6, further comprising selecting the channelization for the spectrum region of interest and dividing the channel into the plurality of bins.

9. The method of claim 6, further comprising selecting the target signal channel mask from among the plurality of signal masks.

10. The method of claim 6, wherein at least one channel identified by the channelization at least partially overlaps at least one other channel identified by the channelization.

11. A dynamic spectrum access device comprising:
a detector configured to measure energy within a plurality of bins, the plurality of bins being within a channel identified by a channelization for a spectrum region of interest, wherein at least one channel identified by the channelization at least partially overlaps at least one other channel identified by the channelization; and
a processor configured to:
determine, on a channel by channel basis, whether the energy measured within the plurality of bins within the channel is a narrowband signal by comparing an energy of the channel with each of a first threshold and a second threshold, wherein the second threshold is lower than the first threshold;
compare a mask, selected from a plurality of masks, to the spectrum within each channel to determine a degree of correlation between the mask and the energy measured within the plurality of bins within the channel;
if the degree of correlation between the mask and the energy measured within the plurality of bins within the channel is above a correlation threshold, classify the received signal as a narrowband signal; and
if the degree of correlation between the mask and energy measured within the plurality of bins within the channel is not above the correlation threshold:
determine a degree of correlation between the measured energy and a target signal channel mask;
classify the measured energy as a wideband signal candidate;
generate a max-hold power spectrum based on a plurality of max-hold overlays;
apply a threshold to the max-hold power spectrum; and
apply a channel mask to the max-hold power spectrum to identify the wide band signal candidate as one of: a target signal, a wide band non-cooperative signal, and noise.

12. The dynamic spectrum access device of claim 11, wherein the processor is further configured to select the channelization for the spectrum region of interest.

13. The dynamic spectrum access device of claim 12, wherein the size of each of the plurality of bins is based upon a resolution of the detector.

14. The dynamic spectrum access device of claim 11, wherein the processor is further configured to select the mask from among the plurality of masks.

15. The dynamic spectrum access device of claim 11, wherein, to determine the degree of correlation between the mask and the energy measured within the plurality of bins within the channel, the processor is further configured to evaluate at least one metric selected from the group consisting of: an area of the mask that corresponds to the measured energy, a mean of the measured energy and the mask, a variance of the measured energy and the mask, a peak-to-mean ratio of the measured energy, and a proximity to a noise floor of the measured energy.

16. A method comprising:
measuring, by a detector, energy within a plurality of bins, the plurality of bins being within a channel identified by a channelization for a spectrum region of interest, wherein at least one channel identified by the channelization at least partially overlaps at least one other channel identified by the channelization;
determining, on a channel by channel basis whether the energy measured within the plurality of bins within the channel is a narrowband signal by comparing an energy of the channel with each of a first threshold and a second threshold, wherein the second threshold is lower than the first threshold;
comparing a mask, selected from a plurality of masks, to the spectrum within each channel to determine a degree of correlation between the mask and the energy measured within the plurality of bins within the channel;
if the degree of correlation between the mask and the energy measured within the plurality of bins within the channel is above a correlation threshold, classifying the received signal as a narrowband signal; and
if the degree of correlation between the mask and the energy measured within the plurality of bins within the channel is not above the correlation threshold:
determining a degree of correlation between the measured energy and a target signal channel mask;
classifying the measured energy as a wideband signal candidate;
generating a max-hold power spectrum based on a plurality of max-hold overlays;
applying a threshold to the max-hold power spectrum; and
applying a channel mask to the max-hold power spectrum to identify the wide band signal candidate as one of: a target signal, a wide band non-cooperative signal, and noise.

17. The method of claim 16, further comprising selecting the channelization for the spectrum region of interest.

18. The method of claim 17, wherein the size of each of the plurality of bins is based upon a resolution of the detector.

19. The method of claim 16, further comprising selecting the mask from among the plurality of masks.

20. The method of claim 16, wherein determining the degree of correlation between the mask and the energy measured within the plurality of bins within the channel, further comprises evaluating at least one metric selected from the group consisting of: an area of the mask that corresponds to the measured energy, a mean of the measured energy and the mask, a variance of the measured energy and the mask, a peak-to-mean ratio of the measured energy, and a proximity to a noise floor of the measured energy.

* * * * *